US012362527B2

(12) United States Patent
Carnevali (10) Patent No.: US 12,362,527 B2
(45) Date of Patent: Jul. 15, 2025

(54) CASES FOR MOBILE DEVICES INCORPORATING A CORD EXTENDING FROM THE CASE AND METHODS OF MAKING AND USING

(71) Applicant: National Products, Inc., Seattle, WA (US)

(72) Inventor: Jeffrey D. Carnevali, Seattle, WA (US)

(73) Assignee: National Products, Inc., Seattle, WA (US)

( * ) Notice: Subject to any disclaimer, the term of this patent is extended or adjusted under 35 U.S.C. 154(b) by 467 days.

(21) Appl. No.: 16/898,299

(22) Filed: Jun. 10, 2020

(65) Prior Publication Data

US 2021/0391678 A1 Dec. 16, 2021

(51) Int. Cl.
| | | |
|---|---|---|
| *H01R 31/06* | (2006.01) | |
| *H01R 13/58* | (2006.01) | |
| *H01R 43/26* | (2006.01) | |
| *H04B 1/3888* | (2015.01) | |

(52) U.S. Cl.
CPC ......... *H01R 31/06* (2013.01); *H01R 13/5816* (2013.01); *H01R 43/26* (2013.01); *H04B 1/3888* (2013.01)

(58) Field of Classification Search
CPC .... H01R 31/06; H01R 13/5816; H01R 43/26; H01R 13/516; H01R 2201/06; H04B 1/3888
See application file for complete search history.

(56) References Cited

U.S. PATENT DOCUMENTS

| | | | |
|---|---|---|---|
| 809,977 | A | 1/1906 | O'Brien |
| 1,786,459 | A | 7/1926 | Simons |
| 2,495,552 | A | 1/1950 | Schmitz |
| 2,549,917 | A | 4/1951 | Millbrandt |
| 2,565,939 | A | 8/1951 | Wriston |

(Continued)

FOREIGN PATENT DOCUMENTS

| | | |
|---|---|---|
| CN | 101674096 | 3/2010 |
| CN | 202268924 | 6/2012 |

(Continued)

OTHER PUBLICATIONS

International Search Report and Written Opinion for PCT Application No. PCT/US2021/036017 mailed Jan. 7, 2022.

(Continued)

*Primary Examiner* — Yuwen Pan
*Assistant Examiner* — Fatuma G Sherif
(74) *Attorney, Agent, or Firm* — Branch Partners PLLC; Bruce E. Black (57) ABSTRACT

A case for a mobile device includes a cover defining a cavity configured for receiving and holding the mobile device, the cover including a first portion and a second portion removably attachable to the first portion; a male plug disposed in the second portion of the cover, extending into the cavity defined by the cover, and configured for insertion into a female socket of the mobile device, the male plug including first contacts configured for mating with contacts of the mobile device; and a cord extending out of the second portion of the cover and including a jacket and wires disposed in the jacket and electrically coupled to the first contacts of the male plug.

20 Claims, 6 Drawing Sheets

(56) References Cited

U.S. PATENT DOCUMENTS

| | | | |
|---|---|---|---|
| 2,612,947 | A | 10/1952 | Jenks |
| 2,717,093 | A | 9/1955 | Mautner |
| 2,803,368 | A | 8/1957 | Koch |
| 3,018,525 | A | 1/1962 | Deisenroth |
| 3,140,883 | A | 7/1964 | Anthony |
| 3,464,579 | A | 9/1969 | Asenbauer |
| 3,667,648 | A | 6/1972 | Koziol |
| 3,885,701 | A | 5/1975 | Becklin |
| 3,972,459 | A | 8/1976 | Cooper |
| 3,978,830 | A | 9/1976 | Toth, Jr. |
| 4,298,204 | A | 11/1981 | Jinkins |
| 4,564,880 | A | 1/1986 | Christ et al. |
| 4,607,772 | A | 7/1986 | Hancock |
| 4,828,558 | A | 5/1989 | Kelman |
| 4,842,174 | A | 6/1989 | Sheppard et al. |
| 4,848,319 | A | 7/1989 | Appeldorn |
| 5,002,184 | A | 3/1991 | Lloyd |
| 5,096,317 | A | 3/1992 | Phillippe |
| 5,135,189 | A | 8/1992 | Ghazizadeh |
| 5,246,133 | A | 9/1993 | James |
| 5,272,771 | A | 12/1993 | Ansell et al. |
| 5,295,602 | A | 3/1994 | Swanson |
| 5,353,934 | A | 10/1994 | Yamauchi |
| 5,535,274 | A | 7/1996 | Braitberg et al. |
| 5,584,054 | A | 12/1996 | Tyneski et al. |
| 5,586,002 | A | 12/1996 | Notarianni |
| 5,641,065 | A | 6/1997 | Owens et al. |
| 5,646,649 | A | 7/1997 | Iwata et al. |
| 5,791,506 | A | 8/1998 | Sheffler et al. |
| 5,813,096 | A | 9/1998 | Soennichsen |
| 5,822,427 | A | 10/1998 | Braitberg et al. |
| 5,842,670 | A | 12/1998 | Nigoghosian |
| 5,845,885 | A | 12/1998 | Carnevali |
| 5,860,550 | A | 1/1999 | Miller et al. |
| 5,895,018 | A | 4/1999 | Rielo |
| 5,917,697 | A | 6/1999 | Wang |
| 5,953,795 | A | 9/1999 | Bauer |
| 5,969,057 | A | 10/1999 | Schoeley et al. |
| 5,990,874 | A | 11/1999 | Tsumura et al. |
| 5,992,807 | A | 11/1999 | Tarulli |
| 6,009,601 | A | 1/2000 | Kaufman |
| 6,010,005 | A | 1/2000 | Reames et al. |
| 6,032,910 | A | 3/2000 | Richter |
| 6,034,505 | A | 3/2000 | Arthur et al. |
| 6,035,800 | A | 3/2000 | Clifford |
| 6,043,626 | A | 3/2000 | Snyder et al. |
| 6,068,119 | A | 5/2000 | Derr et al. |
| 6,149,116 | A | 11/2000 | Won |
| 6,229,893 | B1 | 5/2001 | Chen |
| 6,273,773 | B1 | 8/2001 | Bourke |
| 6,276,552 | B1 | 8/2001 | Vervisch |
| 6,295,198 | B1 | 9/2001 | Loh et al. |
| 6,341,218 | B1 | 1/2002 | Poplawsky et al. |
| 6,356,053 | B1 | 3/2002 | Sandoz et al. |
| 6,377,825 | B1 | 4/2002 | Kennedy et al. |
| 6,406,758 | B1 | 6/2002 | Bottari et al. |
| 6,407,860 | B1 | 6/2002 | Funazaki et al. |
| 6,572,176 | B2 | 6/2003 | Davies et al. |
| 6,585,212 | B2 | 7/2003 | Carnevali |
| 6,588,637 | B2 | 7/2003 | Gates et al. |
| 6,597,924 | B1 | 7/2003 | Smith |
| 6,614,423 | B1 | 9/2003 | Wong et al. |
| 6,646,864 | B2 | 11/2003 | Richardson |
| 6,648,376 | B2 | 11/2003 | Christianson |
| 6,687,516 | B2 | 2/2004 | Chen |
| 6,702,604 | B1 | 3/2004 | Moscovitch |
| 6,754,343 | B2 | 6/2004 | Lundstrom et al. |
| 6,762,585 | B2 | 7/2004 | Liao |
| 6,776,422 | B1 | 8/2004 | Toy |
| 6,785,566 | B1 | 8/2004 | Irizarry |
| 6,785,567 | B2 | 8/2004 | Kato |
| 6,816,713 | B2 | 11/2004 | Chen |
| 6,842,171 | B2 | 1/2005 | Richter et al. |
| 6,953,126 | B2 | 10/2005 | Parker et al. |
| 6,984,680 | B2 | 1/2006 | Quinn |
| 6,995,976 | B2 | 2/2006 | Richardson |
| 7,017,243 | B2 | 3/2006 | Carnevali |
| 7,031,148 | B1 | 4/2006 | Lin |
| 7,068,783 | B2 | 6/2006 | Peiker |
| 7,158,376 | B2 | 1/2007 | Richardson et al. |
| 7,180,735 | B2 | 2/2007 | Thomas et al. |
| 7,230,823 | B2 | 6/2007 | Richardson et al. |
| 7,248,901 | B2 | 7/2007 | Peiker |
| 7,257,429 | B2 | 8/2007 | Kogan |
| 7,283,849 | B2 | 10/2007 | Peiker |
| 7,311,526 | B2 | 12/2007 | Rohrbach et al. |
| 7,312,984 | B2 | 12/2007 | Richardson et al. |
| 7,351,066 | B2 | 4/2008 | DiFonzo et al. |
| 7,464,814 | B2 | 12/2008 | Carnevali |
| 7,480,138 | B2 | 1/2009 | Kogan et al. |
| 7,481,664 | B1 | 1/2009 | Knoll et al. |
| 7,517,222 | B2 | 4/2009 | Rohrbach et al. |
| 7,520,389 | B2 | 4/2009 | Lalouette |
| 7,551,458 | B2 | 6/2009 | Carnevali |
| 7,566,224 | B2 | 7/2009 | Wu |
| 7,594,576 | B2 | 9/2009 | Chen et al. |
| 7,609,512 | B2 | 10/2009 | Richardson et al. |
| 7,612,997 | B1 | 11/2009 | Diebel et al. |
| 7,641,477 | B2 | 1/2010 | DiFonzo et al. |
| 7,645,143 | B2 | 1/2010 | Rohrbach et al. |
| 7,663,879 | B2 | 2/2010 | Richardson et al. |
| 7,688,580 | B2 | 3/2010 | Richardson et al. |
| 7,812,567 | B2 | 10/2010 | Shen |
| 7,841,776 | B2 | 11/2010 | DiFonzo et al. |
| 7,850,032 | B2 | 12/2010 | Carnevali et al. |
| 7,855,529 | B2 | 12/2010 | Liu |
| 7,889,489 | B2 | 2/2011 | Richardson et al. |
| 7,901,216 | B2 | 3/2011 | Rohrbach et al. |
| 7,907,394 | B2 | 3/2011 | Richardson et al. |
| 8,061,516 | B2 | 11/2011 | Carnevali |
| 8,074,951 | B2 | 12/2011 | Carnevali |
| 8,087,939 | B2 | 1/2012 | Rohrbach et al. |
| 8,099,138 | B2 | 1/2012 | Piekarz |
| 8,172,580 | B1 | 5/2012 | Chen et al. |
| 8,177,560 | B2 | 5/2012 | Rohrbach et al. |
| 8,183,825 | B2 | 5/2012 | Sa |
| 8,224,408 | B2 | 7/2012 | Tomasini et al. |
| 8,390,255 | B1 | 3/2013 | Fathollahi |
| 8,405,974 | B2 | 3/2013 | Sayavong |
| 8,414,312 | B2 | 4/2013 | Hung et al. |
| 8,435,042 | B2 | 5/2013 | Rohrbach et al. |
| 8,453,835 | B2 | 6/2013 | So |
| 8,483,758 | B2 | 7/2013 | Huang |
| 8,497,753 | B2 | 7/2013 | DiFonzo et al. |
| 8,560,014 | B1 | 10/2013 | Hu et al. |
| 8,634,887 | B2 | 1/2014 | Hu et al. |
| 8,639,288 | B1 | 1/2014 | Friedman |
| 8,646,698 | B2 | 2/2014 | Chen et al. |
| 8,690,582 | B2 | 4/2014 | Rohrbach et al. |
| 8,729,854 | B2 | 5/2014 | Tsai et al. |
| 8,760,311 | B2 | 6/2014 | Heaton |
| 8,763,802 | B2 | 7/2014 | Ellis-Brown |
| 8,801,441 | B2 | 8/2014 | Zhang et al. |
| 8,825,123 | B1 | 9/2014 | Gudino |
| 8,891,800 | B1 | 11/2014 | Shaffer |
| 8,907,783 | B2 | 12/2014 | Fish et al. |
| 8,911,246 | B2 | 12/2014 | Carnevali |
| 8,929,065 | B2 | 1/2015 | Williams |
| 8,950,717 | B2 | 2/2015 | Chuang |
| 8,970,332 | B2 | 3/2015 | DiFonzo et al. |
| 9,026,187 | B2 | 5/2015 | Huang |
| 9,071,060 | B2 | 6/2015 | Fathollahi |
| 9,072,172 | B2 | 6/2015 | Hsu |
| 9,112,304 | B2 | 8/2015 | Rohrbach et al. |
| 9,123,935 | B2 | 9/2015 | Huang |
| 9,172,781 | B1 | 10/2015 | Goldstein |
| 9,356,267 | B2 | 5/2016 | To et al. |
| 9,647,474 | B2 | 5/2017 | Fathollahi et al. |
| 9,800,701 | B1 * | 10/2017 | Guillen ............ H04M 1/72409 |
| 9,831,904 | B1 | 11/2017 | Carnevali |
| 2004/0108348 | A1 | 6/2004 | Barnes |
| 2005/0189354 | A1 | 9/2005 | Heather et al. |
| 2006/0058073 | A1 | 3/2006 | Kim |
| 2006/0175766 | A1 | 8/2006 | Carnevali |

(56) References Cited

U.S. PATENT DOCUMENTS

| | | | |
|---|---|---|---|
| 2008/0271902 A1* | 11/2008 | Johnson | A62C 3/008 169/56 |
| 2009/0160400 A1 | 6/2009 | Woud | |
| 2009/0314400 A1 | 12/2009 | Liu | |
| 2012/0018325 A1 | 1/2012 | Kim | |
| 2012/0043235 A1 | 2/2012 | Klement | |
| 2012/0118773 A1 | 5/2012 | Rayner | |
| 2012/0211382 A1 | 8/2012 | Rayner | |
| 2012/0250270 A1 | 10/2012 | Liu | |
| 2012/0261306 A1 | 10/2012 | Richardson et al. | |
| 2012/0298536 A1 | 11/2012 | Rauta et al. | |
| 2013/0092576 A1 | 4/2013 | Rayner | |
| 2013/0106353 A1 | 5/2013 | Foster | |
| 2013/0193006 A1 | 8/2013 | Bergreen et al. | |
| 2013/0220841 A1 | 8/2013 | Yang | |
| 2013/0258573 A1 | 10/2013 | Muday et al. | |
| 2013/0273752 A1 | 10/2013 | Rudisill et al. | |
| 2013/0273983 A1 | 10/2013 | Hsu | |
| 2013/0331156 A1 | 12/2013 | Lui | |
| 2013/0334071 A1 | 12/2013 | Carnevali | |
| 2014/0168885 A1 | 6/2014 | Williams | |
| 2014/0178222 A1* | 6/2014 | Hou | F04D 25/0613 417/423.15 |
| 2015/0146401 A1 | 5/2015 | Su et al. | |
| 2015/0189780 A1 | 7/2015 | Su et al. | |
| 2015/0270861 A1 | 9/2015 | Lin et al. | |
| 2015/0358439 A1* | 12/2015 | Carnevali | H04B 1/3888 455/575.8 |
| 2016/0065702 A1 | 3/2016 | Carnevali | |
| 2016/0372858 A1* | 12/2016 | Huo | H01R 13/6581 |
| 2017/0140887 A1* | 5/2017 | Waters | G06F 1/266 |
| 2017/0227987 A1 | 8/2017 | Carnevali et al. | |
| 2017/0373450 A1* | 12/2017 | Solland | H01R 29/00 |
| 2018/0307284 A1* | 10/2018 | Saravis | G06F 1/206 |
| 2018/0369469 A1* | 12/2018 | Le Duc De Lillers | A61M 60/148 |
| 2020/0192441 A1 | 6/2020 | Saravis | |
| 2020/0274292 A1* | 8/2020 | Goodfellow | H01R 13/6273 |

FOREIGN PATENT DOCUMENTS

| | | |
|---|---|---|
| CN | 202565335 | 11/2012 |
| CN | 203135945 | 8/2013 |
| CN | 204408423 | 6/2015 |
| JP | 2004-349969 | 12/2004 |
| JP | 2014-75327 | 4/2014 |
| KR | 20-0265673 | 2/2002 |
| KR | 20070031130 | 3/2007 |
| KR | 20100000015 U * | 1/2010 |
| KR | 10-1078214 | 11/2011 |
| TW | 531119 | 5/2003 |
| TW | M376983 | 3/2010 |
| TW | M422808 | 2/2012 |
| WO | 2012/052751 | 4/2012 |
| WO | 2013/081222 | 6/2013 |
| WO | 2014/054426 | 4/2014 |
| WO | 2015/022675 | 2/2015 |

OTHER PUBLICATIONS

Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

Officeonthego.com, 3 pages of product description of Magnifico ® PLUS screen magnifier product information retrieved from web site at: www.officeonthego.com.

2 pages of product information for Armor 1600 and Armor 1601 waterproof, dustproof and airtight protective cases.

2 pages OTTEROX 4600 Tablet PC Case protective cases product information retrieved from web site at: www.otterbox.com.

Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].

Certified English Translation of Chinese Published Patent Disclosure No. CN 1312603A ("Huang") (Foreign reference previously cited).

Official Communication received for U.S. Appl. No. 16/928,952 mailed Dec. 6, 2021.

Official Communication received for U.S. Appl. No. 16/928,952 mailed Jun. 3, 2022.

1 Official Communication received for U.S. Appl. No. 16/928,952 mailed Nov. 10, 2022.

* cited by examiner

CASES FOR MOBILE DEVICES INCORPORATING A CORD EXTENDING FROM THE CASE AND METHODS OF MAKING AND USING

FIELD

The present invention is directed to cases for a mobile device. The present invention is also directed to cases for a mobile device that includes a cord extending from the case.

BACKGROUND

Mobile devices, such as smartphones, cellular or mobile phones, tablets, personal data assistants, and other portable devices, are now ubiquitous. Cases are typically used to protect the mobile device.

BRIEF SUMMARY

One embodiment is a case for a mobile device that includes a cover defining a cavity configured for receiving and holding the mobile device, the cover including a first portion and a second portion removably attachable to the first portion; a male plug disposed in the second portion of the cover, extending into the cavity defined by the cover, and configured for insertion into a female socket of the mobile device, the male plug including a plurality of first contacts configured for mating with contacts of the mobile device; and a cord extending out of the second portion of the cover and including a jacket and a plurality of wires disposed in the jacket and electrically coupled to the first contacts of the male plug.

In at least some embodiments, the cord includes a connector disposed on an end of the cord opposite the cover. In at least some embodiments, the cord is configured to be hardwired into a device at an end of the cord opposite the cover.

In at least some embodiments, the case further includes a clamp configured to clamp the cord to a surface, device, or other article. In at least some embodiments, the clamp includes a body, at least two core tie openings positioned with one of the cord tie openings at a first end portion of the body and another one of the cord tie openings at a second end portion of the body opposite the first end portion of the body, and at least four connector tie openings with two of the connector tie openings disposed opposite each other at a first position along the body and another two of the connector tie openings disposed opposite each other at a second position along the body.

In at least some embodiments, the case further includes a strain relief element coupled to a portion of the cord extending out of the second portion of the cover. In at least some embodiments, the first portion of the cover include at least one fastener receiver and the second portion of the cover includes at least one fastener ring, wherein the case further includes at least one fastener configured to fit through the fastener ring into the fastener receiver to attach the first portion to the second portion.

In at least some embodiments, the male plug includes a plurality of second contacts that are electrically coupled to the first contacts of the male plug. In at least some embodiments, the wires of the cord are attached to the second contacts of the male plug. In at least some embodiments, the second contacts and portions of the wires attached to the second contacts are potted in a non-conductive material disposed within the second portion of the cover.

In at least some embodiments, the case further includes an accessory attachment attachable to the cover, wherein the accessory attachment includes at least one accessory. In at least some embodiments, the at least one accessory includes a mount configured to mount the case on a mounting arrangement. In at least some embodiments, the at least one accessory includes a fan. In at least some embodiments, the accessory attachment includes a base and an attachment arm extending from the base and configured to engage a front surface and a back surface of the cover to attach the accessory attachment to the cover. In at least some embodiments, the attachment arm includes a roller configured to engage the cover and to roll as the roller is passed over the cover.

Another embodiment is an arrangement that includes any of the cases described above and the mobile device receivable within the case and including the female socket configured to receive the male plug of the adapter of the case.

A further embodiment is an arrangement that includes any of the cases described above and a device, where the cord of the case is hardwired to the device.

Yet another embodiment is a method of using any of the cases described above with a mobile device. The method includes inserting the mobile device into the first portion of the cover; inserting the male plug in the second portion of the cover into a female socket of the mobile device; fastening the second portion of the cover to the first portion of the cover; and tethering the cord to an article or device.

In at least some embodiments, tethering the cord includes attaching a connector of the cord to the device. In at least some embodiments, tethering the cord includes hardwiring the cord to the device. In at least some embodiments, tethering the cord includes fastening the cord to an article or device using a clamp or other fastener.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to cases for a mobile device. The present invention is also directed to cases for a mobile device that includes a cord extending from the case.

Mobile devices are used in a variety of contexts for interactions with multiple users. For example, a mobile device can be used in a delivery vehicle for managing the deliveries. The driver of the delivery vehicle may pass the mobile device to another person outside the vehicle, for example, for review of the cargo. In addition, the driver may leave the mobile device in the vehicle during meals, deliveries, or at the end of the day or shift. It is beneficial if the mobile device is tethered to the vehicle to prevent or hinder others from permanently removing the mobile device from the vehicle. Similarly, mobile devices can be used as point-of-sale devices to complete transactions with a customer. It is beneficial if the mobile device is tethered to, for example, a counter, cash register, or other article or device to prevent or hinder others from permanently removing the mobile device.

Figure 1A:
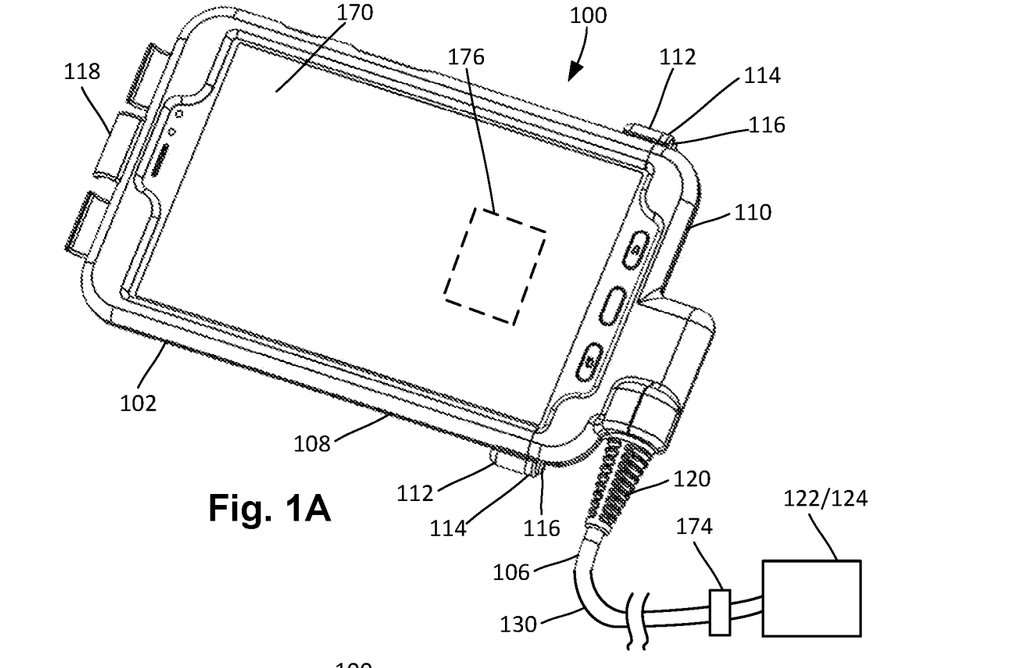
FIG. 1A is a schematic perspective front view of a first embodiment of a case for a mobile device, according to the invention.
Figure 1B:
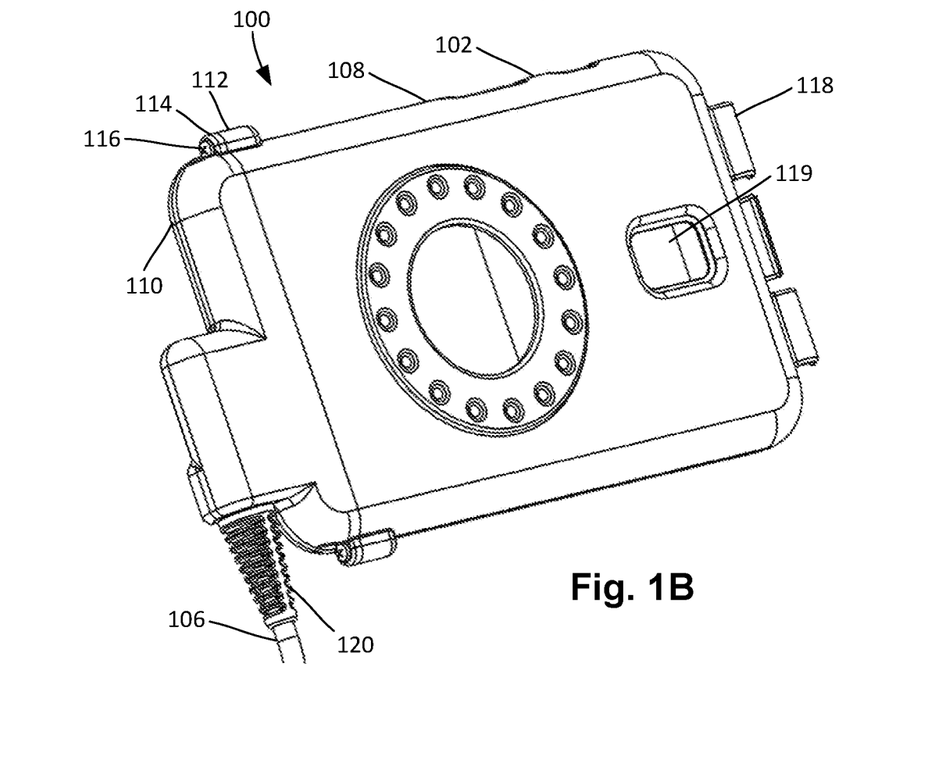
FIG. 1B is a schematic perspective back view of the case of FIG. 1A, according to the invention.
Figure 1C:
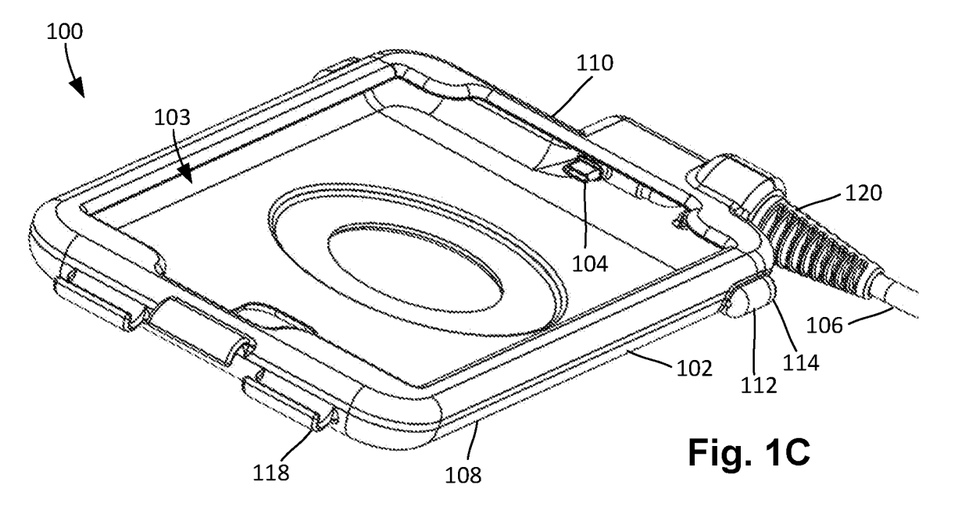
FIG. 1C is a schematic perspective front view of the case of FIG. 1A from a different angle and without the mobile device, according to the invention.

FIGS. 1A to 1C illustrate one embodiment of a case 100 for a mobile device, such as a cellular or mobile phone, a smartphone, a tablet, a personal data assistant, or any other suitable mobile device. The case 100 includes a cover 102 which defines a cavity 103 (FIG. 1C) to receive the mobile device, a male plug 104 (FIG. 1C) which extends from the cover into the cavity, and a cord 106 which extends from the cover, may act as a tether, and may be coupled to a power or data source.

The cover 102 includes a first portion 108 and a second portion 110 removably attachable to the first portion. In at least some embodiments, the first portion 108 includes at least one fastener receiver 112 and the second portion 110 includes at least one fastener ring 114 that aligns with the fastener receiver for insertion of a fastener 116, such as a screw or bolt, to hold the first portion and second portion together. (In other embodiments, the first portion 108 can include at least one fastener ring 114 and the second portion can include at least one fastener receiver 112.) In the illustrated embodiment, the first portion 108 includes two fastener receivers 112 on opposite sides of the cover 102, the second portion 110 includes two fastener rings 114 on opposite sides of the cover, and two fasteners 116 hold the first and second portions together. In at least some embodiments, the mobile device 170 is loaded into the case 100 by separating the first and second portions 108, 110, inserting the mobile device into the cavity 103, and the fastening the second portion to the first portion using the fastener(s) 116. Other arrangements for fastening the first portion 108 to the second portion 110 can be used include snap-fasteners, clip fasteners, or the like or any combination thereof.

The cover 102 can be made of any suitable material including any suitable polymeric material. The cover 102 can be made of a flexible material (for example, thermoplastic elastomeric polymer materials, other suitable flexible or elastomeric polymer materials, or the like or any combination thereof) or a rigid material or any combination thereof. For example, flexible covers that can be modified to include first and second portions 108, 110 and a cord 106 are described in U.S. Pat. Nos. 9,195,279; 9,331,444; 9,529,387; 9,602,639; 9,632,535; 9,706,026; 10,050,658; 10,054,984; 10,389,399; 10,454,515; and 10,630,334 and U.S. patent application Ser. Nos. 16/835,544; 16/853,565; and Ser. No. 16/866,156, all of which are incorporated herein by reference in their entireties.

In some embodiments, the cover 102 can include a flexible covering and a rigid frame disposed at least partially within the flexible covering. The terms "flexible" and "rigid", when used in the context of "flexible covering" and "rigid frame", are intended to be relative to each other, such that the flexible covering feels more flexible, as judged by an average adult user, than the rigid frame and the rigid frame is more rigid, as judged by the average adult user, than the flexible cover. Further details regarding such cases that can be modified to include first and second portions 108, 110 and a cord 106 can be found in U.S. patent application Ser. No. 16/853,544, which is incorporated herein by reference in its entirety.

When the mobile device is received in the case 100, the cover 102 is arranged to cover at least a portion of all the side surfaces of the mobile device and to extend over at least a portion (or all) of the peripheral edges of the front and back surfaces of the mobile device to hold the mobile device in the case and to provide protection to the mobile device. The cover 102 can include one or more openings 119 to provide access to a speaker, a microphone, a camera, a light, a jack, buttons, switches, or the like on the mobile device. Optionally, the cover 102 can include one or more soft buttons (not shown) that are positioned in the flexible covering to coincide with positions (or possible positions) of buttons on the mobile device. The soft buttons are arranged so that depression of the soft buttons with sufficient force results in depression of the buttons of a mobile device received in the case 100. Optionally, the case 100 can include a stylus holder 118 extending from the cover 102 for holding a stylus 172 (FIG. 3B).

Figure 2A:
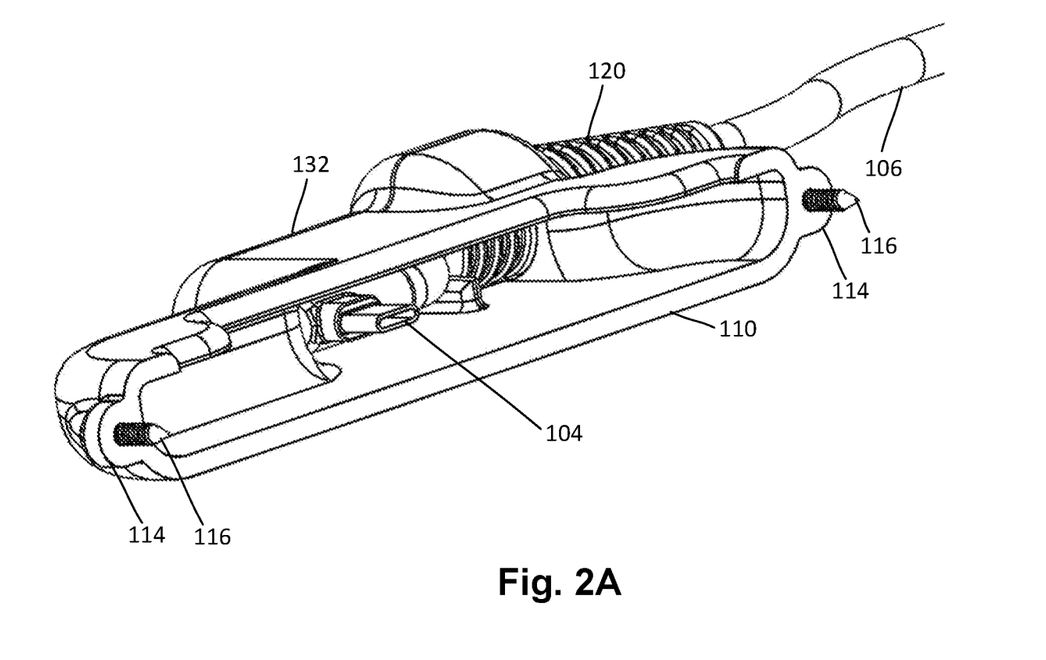
FIG. 2A is a schematic perspective front view of a second portion of a cover of the case of FIG. 1A, according to the invention.

FIG. 2A illustrates the second portion 110 of the cover 102 with the male plug 104 disposed in the second portion and the cord 106 extending from the second portion. The fastener rings 114 and fasteners 116 are also illustrated. The male plug 104 includes first contacts 140 (FIG. 3) and is configured to be inserted into the female socket of the mobile device 170 so that the first contacts 140 of the male plug 104 are electrically coupled to the contacts 142 (FIG. 3) in the female socket of the mobile device. In at least some embodiments, the male plug 104 can be any suitable type of male connector, depending on the mobile device to be used, including, but not limited to, any type of USB connector (for example, any type of USB-A, USB-B, USB-C, Micro-USB, or Mini-USB connector) or a Lightning connector.

The cord 106 extends from the cover 102 and preferably includes a strain relief element 120 where the cord exits the cover. Any suitable strain relief element 120 can be used including, for example, the baffle-type strain relief in the illustrated embodiments.

Figure 3:
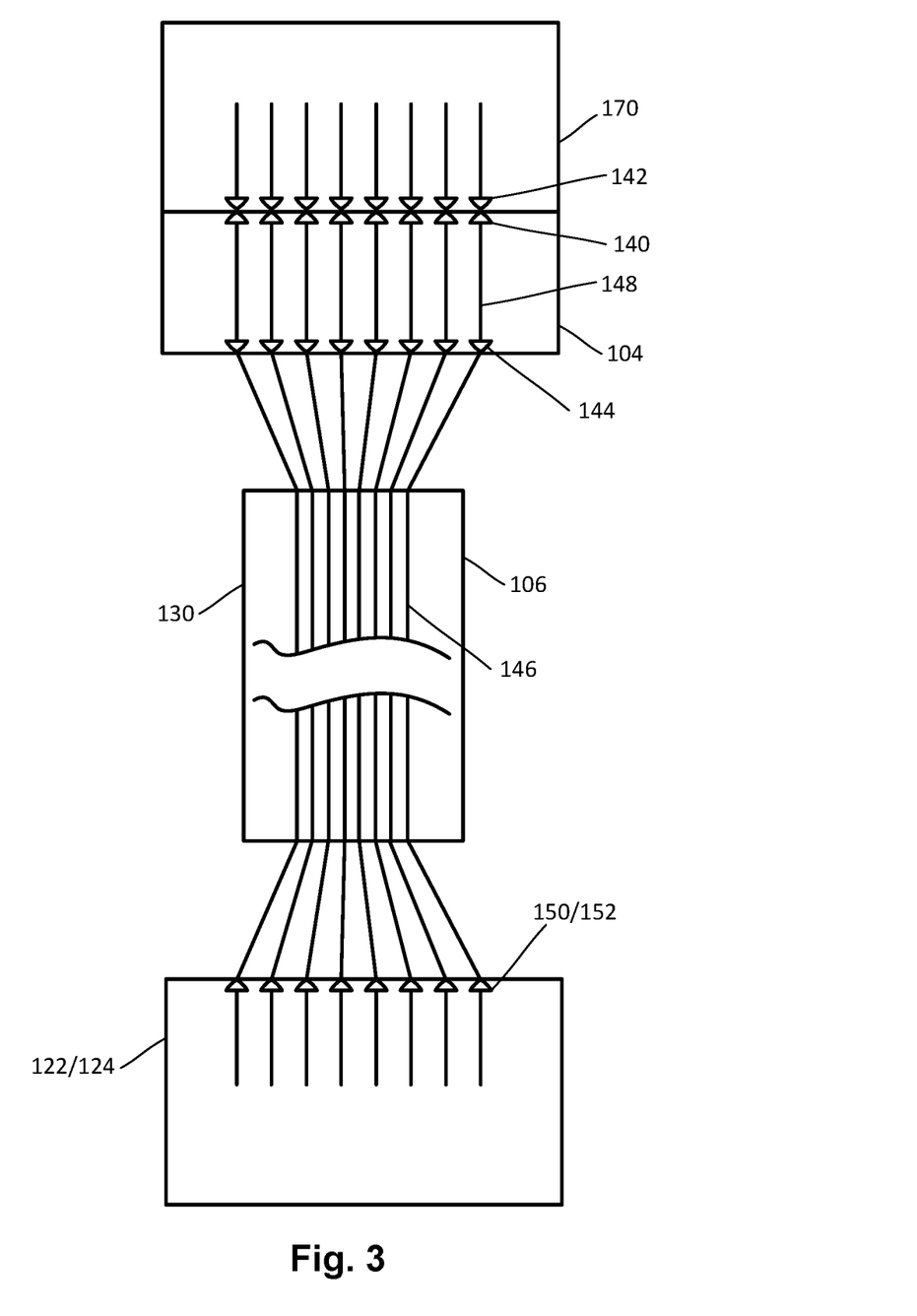
FIG. 3 is a block diagram of a first embodiment of electrical connection between a mobile device, the case of FIG. 1A including the cord of the case, and either a connector on the cord or a device to which the cord is hardwired, according to the invention.

The cord 106 includes a jacket 130 encasing wires 146 (FIG. 3). FIG. 3 is a schematic diagram illustrating the wires 146 electrically coupled to second contacts 144 on the male plug 104 which, in turn, are coupled to the first contacts 140 of the male plug through conductors 148, as illustrated in FIG. 3. The wires 146 extend along the cord 106.

In some embodiments, the cord 106 ends in a connector 122 such as, for example, any type of USB connector (for example, any type of USB-A, USB-B, USB-C, Micro-USB, or Mini-USB connector), Lightning connector, prong connector, audio- or video-type connector, connector for a vehicle cigarette lighter, or the like, where the wires 146 of the cord 106 are electrically coupleable to contacts 150 of the connector 122.

In some embodiments, the cord 106 is configured to be hardwired to a device 124, such as a power source, data source, or other device, which may be part of a vehicle, counter, cash register, or the like. When hardwired, the wires 146 of the cord 106 are electrically coupled to contacts 152 of the device 124. In at least some embodiments, the hardwiring of the cord 106 can hinder or prevent removal of the mobile device 170 and case 100 from the vehicle, store, or the like.

In at least some embodiments, the cord 106 can be clamped or otherwise fastened at one or more positions along the cord to a surface, device, vehicle, counter, or the like using a clamp 174 (FIG. 1A) or any other type of fastener.

Figure 2B:
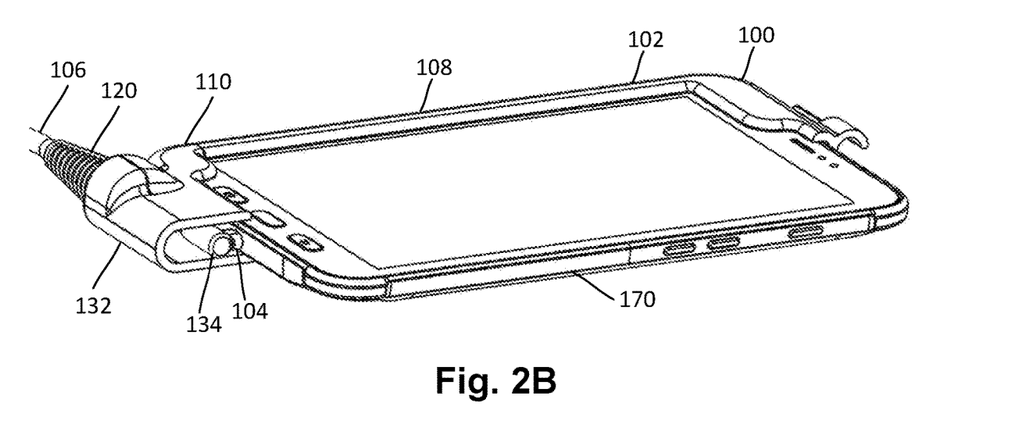
FIG. 2B is a schematic perspective partial cut-away side view of the case of FIG. 1A, according to the invention.
Figure 2C:
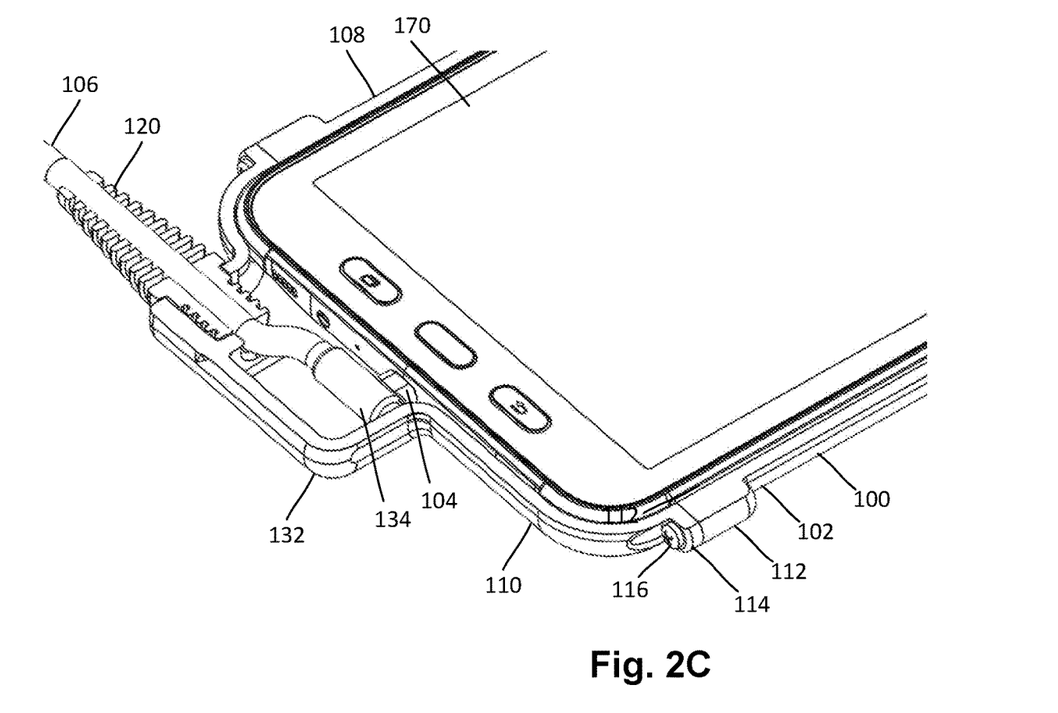
FIG. 2C is a schematic perspective partial cut-away top view of the case of FIG. 1A, according to the invention.

FIGS. 2B and 2C are partial cross-sectional views of the case 100 to illustrate the arrangement of the cord 106 coupled to the male plug 104. Wires 146 (FIG. 3) within the cord 106 are electrically coupled to the second contacts 144 (FIG. 3) of the male plug 104. In at least some embodiments, the male plug 104 is arranged at or near a 90-degree angle relative to the cord 106. In at least some embodiments, the end of the male plug 104 near the cord 106 and the end of the cord may be potted in a material 134 such as epoxy or any other suitable material to stabilize the arrangement which, in at least some embodiments, is disposed in a housing 132 that is part of the second portion 110 of the cover 102. The housing 132 extends away from the cavity 103 and the remainder of the second portion. The strain relief element 120, which may be partially disposed in the housing 132, is provided on the cord 106 as it exits the housing 132 to resist breakage or damage to the cord.

In at least some embodiments, the mobile device 170 can be operated without a battery and, instead, power is provided to the mobile device through a power source, such as device 124 (or to a device coupled to the plug through connector 122), coupled to the cord 106 with power being directed from the power source, through the cord and the male plug 104 of the case 100, to the mobile device 170. This may be a further deterrent to removal of the mobile device 170 from the vehicle, store, or other site of use as the mobile device does not include a battery.

In at least some embodiments, the mobile device 170 may be designed to detect the presence of a battery in order to operate. In such embodiments, a dummy battery 176 may be placed in the mobile device 170. The dummy battery 176 may be capable of storing a relatively small amount of energy to pass a battery detection test of the mobile device. For example, the dummy battery 176 may contain a capacitor capable of storing sufficient energy to pass the battery detection test.

Figure 4A:
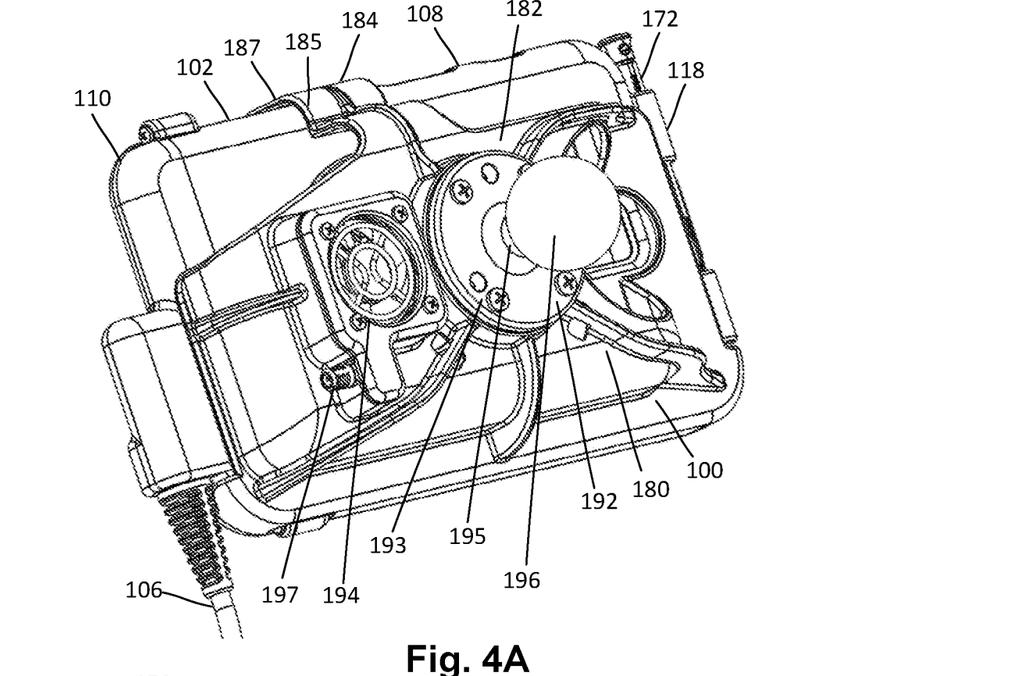
FIG. 4A is a schematic perspective back view of one embodiment of an accessory attachment attached to the case of FIG. 1A, according to the invention.
Figure 4B:
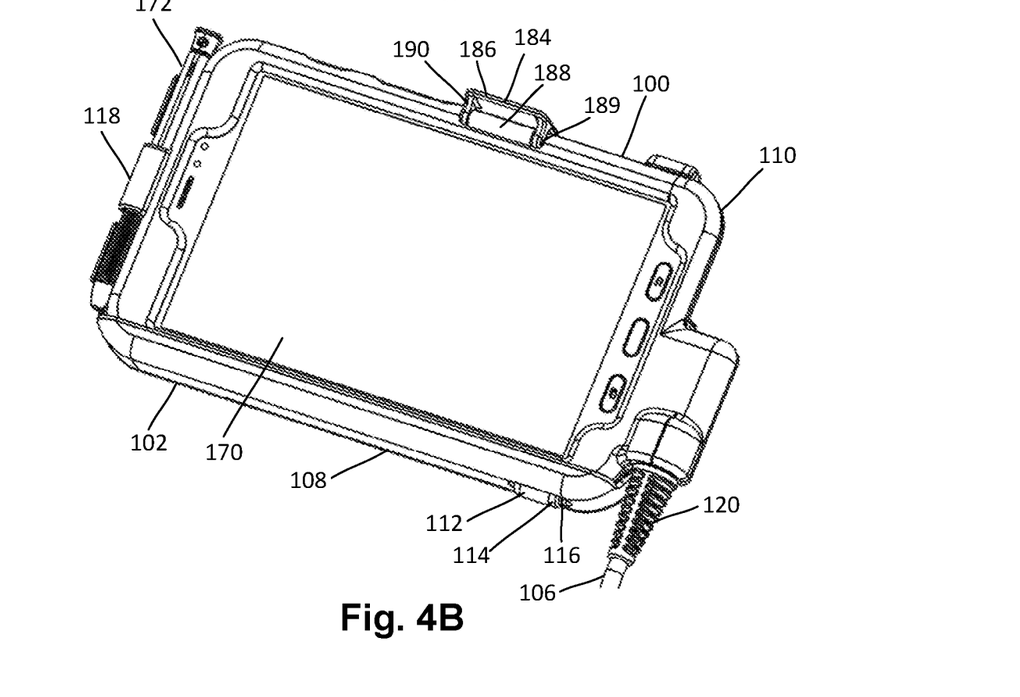
FIG. 4B is a schematic perspective front view of the accessory attachment and the case of FIG. 4A, according to the invention.

FIGS. 4A and 4B illustrate an optional accessory attachment 180 that is removably attached to the cover 100 and mobile device 170. The accessory attachment 180 includes a base 182 and an attachment arm 184 extending from the base for attaching the accessory attachment to the cover 100. The attachment arm 184 has a back cover engagement portion 185, a front cover engagement portion 186, and a cover width portion 187 extending between the back cover and front cover engagement portions. In at least some embodiments, the back cover and front cover engagement portions 185, 186 are arranged to fit snugly on the cover 100 with the mobile device 170 disposed therein to retain the accessory attachment 180 on the cover 100. In at least some embodiments, the front cover engagement portion 186 includes a roller 188 which can roll on an axle 189 held by two legs 190 to facilitate attachment of the accessory attachment 180 to the cover 100.

The accessory attachment 180 can have attached or attachable one or more accessories, such as a mount 192 or a fan 194. The mount 192 can be any suitable mount that can be used to attach the cover 100 and mobile device 170 to a mounting device. Non-limiting examples of mounts and mounting devices can be found at, for example, U.S. Pat. Nos. 5,845,885; 6,561,476; 7,320,50; 7,997,554; 8,454,178; 8,505,861; 9,831,904; RE42,060; RE42,581; and RE43,806, all of which are incorporated herein by reference in their entireties. In the illustrated embodiment, the mount 192 includes a mount base 193 that is coupled to the base 182 of the accessory attachment 180, a narrow neck 195 attached to the mount base, and a ball 196 attached to the narrow neck. One or more of the mount base 193, the narrow neck 195, of the ball 196 can be replaced by any other suitable mounting arrangement.

The fan 194 is coupled to the base 182 of the accessory attachment 180. In the illustrated embodiment, the fan 194 includes a jack 197 for coupling a cord that attaches to a power source for the fan. In at least some embodiments, the case 100 may include cord to couple to the jack 197 that can provide power or the case 100 may include a jack so that a cord can be attached between that jack and jack 197 to provide power to the fan.

Figure 5A:
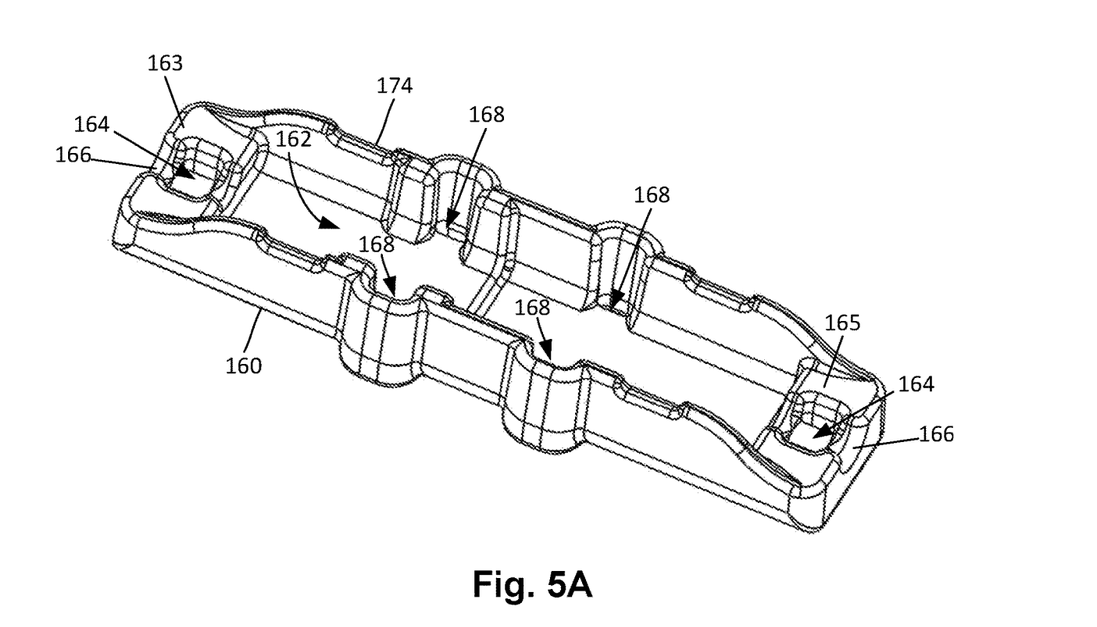
FIG. 5A is a schematic perspective view of one embodiment of a clamp, according to the invention.
Figure 5B:
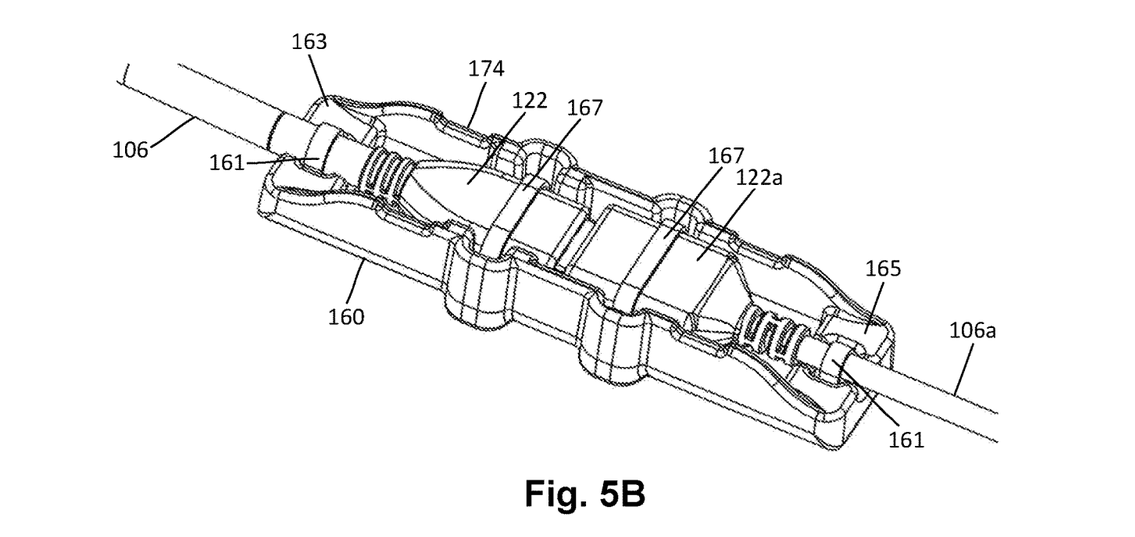
FIG. 5B is a schematic perspective view of the clamp of FIG. 5B with two cords and two connectors attached to each other and tied down in the clamp, according to the invention.

FIGS. 5A and 5B illustrate one embodiment of a clamp 174 that can receive the connector 122 attached to the cord 106 to clamp the cord to a surface, device, other article, or the like. The clamp 174 includes a body 160 that defines a channel 162 for receiving the connector 122 and a portion of the cord 106. In at least some embodiments, the channel 162 may also receive another connector 122a and portion of a cord 106a wherein the connector 122a is attached to the connector 122.

The body 160 of the clamp 174 includes two opposing cord tie openings 164 at the entry portion 163 and exit portion 165 of the clamp 174. In at least some embodiments, the entry portion 163 and exit portion 165 include rounded indents 166 into which the cords 106, 106a fit, as illustrated in FIG. 5B. Cable ties 161 or other fasteners can be placed around the cords 106, 106a, as illustrated in FIG. 5B, and pass through the cord tie openings 164 on both sides of the cords 106, 106a. The cable ties 161 can then be fastened around a portion of a surface, device, or other article to tie down the clamp 174 and cords 106, 106a to the surface, device, or other article.

The body 160 of the clamp 174 includes four connector tie openings 168 with two opposite each other at one position along the clamp and the other two opposite each other at a second position along the clamp. Cable ties 167 or other fasteners can be placed around the connectors 122, 122a and pass though two of the connector tie openings 168, as illustrated in FIG. 5B. The cable ties 167 can then be fastened around a portion of a surface, device, or other article to tie down the clamp 174 and connectors 122, 122a to the surface, device, or other article.

Alternatively, the cord 106 can be disposed along the length of the clamp 174 and two or more (or even all four) of the cable ties 161, 167 can be used to tie down the clamp and the cord to the surface, device, or other article.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A case for a mobile device, the case comprising:
    a cover defining a cavity configured for receiving and holding the mobile device, the cover comprising a first portion and a second portion removably attachable to the first portion;
    a male plug disposed in the second portion of the cover, extending into the cavity defined by the cover, and configured for insertion into a female socket of the mobile device, the male plug comprising a plurality of first contacts configured for mating with contacts of the mobile device; and
    a cord permanently attached to the cover and extending out of the second portion of the cover, wherein the cord comprises a jacket and a plurality of wires disposed in the jacket and electrically coupled to the first contacts of the male plug, wherein a portion of the jacket and a portion of each of the wires are disposed within the second portion of the cover.

2. The case of claim 1, wherein the cord comprises a connector disposed on an end of the cord opposite the cover.

3. The case of claim 1, wherein the cord is configured to be hardwired into a device at an end of the cord opposite the cover.

4. The case of claim 1, further comprising a strain relief element coupled to a portion of the cord extending out of the second portion of the cover.

5. The case of claim 1, wherein the first portion of the cover comprises at least one fastener receiver and the second portion of the cover comprises at least one fastener ring, wherein the case further comprises at least one fastener configured to fit through the at least one fastener ring into the at least one fastener receiver to attach the first portion to the second portion.

6. The case of claim 1, wherein the male plug comprises a plurality of second contacts that are electrically coupled to the first contacts of the male plug.

7. The case of claim 6, wherein the wires of the cord are directly and permanently attached to the second contacts of the male plug.

8. The case of claim 1, further comprising an accessory attachment attachable to the cover, wherein the accessory attachment comprises at least one accessory.

9. The case of claim 8, wherein the at least one accessory comprises a mount configured to mount the case on a mounting arrangement.

10. The case of claim 8, wherein the at least one accessory comprises a fan.

11. The case of claim 8, wherein the accessory attachment comprises a base and an attachment arm extending from the base and configured to engage a front surface and a back surface of the cover to attach the accessory attachment to the cover.

12. The case of claim 11, wherein the attachment arm comprises a roller configured to engage the cover and to roll as the roller is passed over the cover.

13. An arrangement, comprising:
    the case of claim 1; and
    the mobile device receivable within the case and comprising the female socket configured to receive the male plug of the case.

14. The arrangement of claim 13, further comprising a clamp configured to clamp the cord to a surface, device, or other article.

15. An arrangement, comprising:
    the case of claim 1; and
    a device, wherein the cord of the case is hardwired to the device.

16. A method of using the case of claim 1 with a mobile device, the method comprising:
    inserting the mobile device into the first portion of the cover;
    inserting the male plug in the second portion of the cover into a female socket of the mobile device;
    fastening the second portion of the cover to the first portion of the cover; and
    tethering the cord to an article or device.

17. The method of claim 16, wherein tethering the cord comprises attaching a connector of the cord to the device.

18. The method of claim 16, wherein tethering the cord comprises hardwiring the cord to the device.

19. The method of claim 16, wherein tethering the cord comprises fastening the cord to the article or device using a clamp or other fastener.

20. An arrangement, comprising:
    a case for a mobile device, the case comprising
        a cover defining a cavity configured for receiving and holding the mobile device, the cover comprising a first portion and a second portion removably attachable to the first portion,
        a male plug disposed in the second portion of the cover, extending into the cavity defined by the cover, and configured for insertion into a female socket of the mobile device, the male plug comprising a plurality of first contacts configured for mating with contacts of the mobile device, and
        a cord extending out of the second portion of the cover and comprising a jacket and a plurality of wires disposed in the jacket and electrically coupled to the first contacts of the male plug;
    a clamp configured to clamp the cord to a surface, device, or other article, wherein the clamp comprises a body, wherein the body defines a closed perimeter of each of at least two cord tie holes positioned with one of the cord tie holes passing through a first end portion of the body and another one of the cord tie holes passing through at a second end portion of the body opposite the first end portion of the body, wherein the body further defines at least four connector tie openings with two of the connector tie openings disposed opposite each other at a first position along the body and another two of the connector tie openings disposed opposite each other at a second position along the body;
    at least two cable ties, wherein each cable tie is configured to independently extend through two of the connector tie openings to tie the cord to the body of the clamp; and
    at least one cord tie, wherein the at least one cord tie is configured for forming a loop over the cord with two ends extending through a one of the cord tie holes for attaching the cord to the surface, device, or other article.

* * * * *